United States Patent Office 3,261,888
Patented July 19, 1966

3,261,888
CROSS-LINKED TERPOLYMER OF ETHYLENE PROPYLENE AND NON-CONJUGATED DIENE EXHIBITING HIGH TEMPERATURE RESISTANCE TO SOFTENING, STIFFENING OR EMBRITTLEMENT
John A. Cornell, Philadelphia, and Lloyd Raymond Olson, Glenolden, Pa., and John Tremain Howarth, Reading, Mass., assignors, by direct and mesne assignments, to Sartomer Resins, Inc., Essington, Pa., a corporation of Delaware
No Drawing. Filed Nov. 14, 1963, Ser. No. 323,587
15 Claims. (Cl. 260—877)

This invention relates to a vulcanized composition of matter consisting essentially of a terpolymer of 33–80 mol percent of ethylene, 1–15 mol percent of non-conjugated diene having at least 6 carbon atoms and the remainder propylene, which is reacted with a heat-resistant organic peroxide capable of being heated to a temperature of at least 200° F. without substantial decomposition for decomposing rapidly at temperatures of 300–425° F. for reaction of the terpolymer with a bis-vinylidene bifunctional cross-linking agent.

The terpolymer of 33–80 mol percent of ethylene, 1–15 mol percent of non-conjugated diene having at least 6 carbon atoms and the remainder propylene is known in U.S. Patent No. 2,933,480, granted April 19, 1960, in the name of Gresham and Hunt, and has been proposed by these patentees as a sulfur-vulcanizable unsaturated elastomer which is soluble in benzene, toluene, tetrachlorethylene, carbon tetrachloride and chlorobenzene and is prepared by the ionic polymerization of the monomers in inert hydrocarbon or chlorinated hydrocarbon solvents. For the purposes of the present invention, the nonconjujated diene which is employed is preferably one of 1,4-pentadiene, 1,4-hexadiene, 2-methyl-1,5-hexadiene, dicyclopentadiene, 11-ethyl-1, 11-tridecadiene.

As explained in the Gresham et al. patent, the terpolymer polymerized by ionic polymerization is provided in a molecular weight corresponding to an intrinsic viscosity in benzene at 250° C. of between 0.5 and 5.0, e.g. the molecular weight lying between about 15,000 and 1,000,000, and the terpolymer containing ethylenic unsaturation corresponding to an iodine number of at least 3 and not more than 50.

The terpolymer has been suggested as a replacement for styrene butadiene copolymer rubber, for butyl rubber and for natural rubber because it offers, for the sulfur cure, superior end product durability at competitive cost. Its projected applications in the sulfur cure are for molded and extruded rubber goods, shoe soles and heels, rubber hose, rubber belts and for tires. Its outstanding characteristic is its resistance to physical and chemical agencies, e.g. ozone-resistance, heat-resistance, weather-resistance and chemical resistance, to make it superior to butyl, natural and styrene butadiene rubber.

However, the terpolymer, cured with sulfur under the conditions recommended by the owner of the Gresham et al. patent, is completely unsuitable in the area of extruded or coating insulation for wire and cable. The vulcanized terpolymer products containing sulfur are completely unsuitable as an electrical insulation because of the chemical attack by sulfur on the conductor copper, and because of the known tendency of high "free sulfur" to cause breakdown of the dielectric when used at high temperature for any length of time.

Rubber has long been known to be one of the outstanding dielectric materials; but it has been displaced, largely by synthetic plastic materials, due to the inability to meet the increasingly high and rigid specifications and standards.

Thus, in the instances where rubber insulation is used for its physical characteristics of toughness, modulus of elasticity, tensile strength, and resistance to abrasion, it has been necessary to formulate rubber insulation in three layers, e.g., a thin layer of high grade or almost pure rubber adjoining the wire, followed by a layer of white rubber, and then a layer of either black or colored rubber. The idea of the initial layer of almost pure rubber is to keep free sulfur away from the copper.

It has been discovered that the terpolymer reacted with cross-linking agent and peroxide in accordance with the present invention provides a more valuable and much more versatile system for wire and cable insulation then polyethylene or natural rubber because of outstanding ozone resistance and aging properties and because of the resistance to hardening at low temperature and at high temperature, thereby overcoming the outstanding deficiencies which have prevented commercial use of the sulfur cure for wire coating.

It is just as critical to select the proper peroxide as it is to select the proper terpolymer and cross-linking agent for the achievement of the new result of excellence in wire and cable insulation. Only a limited class of peroxides is useful; members of this class must resist decomposition at temperatures up to about 190°–210° F., which is the temperature range encountered during processing in the Banbury mill or on the two-roll rubber mill, yet the peroxide must decompose rapidly at temperatures of from 275–425° F., which is the operating temperature range for curing the terpolymer with the bis-vinylidene bifunctional cross-linking agent.

Certain organic peroxides which are widely used as cross-linking and polymerization accelerators are completely inoperative under these temperature conditions imposed by the present invention. Benzoyl peroxide, the most commonly used peroxide, is not suitable because it decomposes too rapidly at temperatures of about 200° F. Similarly, lauroyl peroxide, methyl ethyl ketone peroxide or 2,2-bis-t-butyl peroxybutane are all unsuitable because of uncontrolled decomposition at temperatures of about 200° F.

Only those peroxides which do not decompose at temperatures of about 200° F. (190–210° F.), but which can be decomposed rapidly at higher temperatures, from 275–425° F., can be employed for processing with the terpolymer and cross-linking agent. If the decomposition is not sufficiently rapid at temperatures below about 425°, the result would be that the cross-linking agent would vaporize before it could react, the terpolymer would be heat degraded and the cost of processing would become excessive.

It is surprising to find that certain heat-resistant peroxides can provide efficient initiation of polymerization in the presence of all of the filler ingredients generally employed. The temperature resistant peroxides used in the present invention operate at a higher temperature level for vulcanization than the "high temperature" peroxides used as catalyst in vinyl polymerization. These latter "high temperature" peroxides are set forth at page 777 of Schildknecht's Polymer Process, vol. 10, "High Polymers," Interscience Publishers Inc., New York, 1956. Ditertiary butyl peroxide, which is set forth in the foregoing volume, cannot be used because it is too volatile and reacts during compounding.

The following peroxides are suitable:

Dicumyl peroxide;
2,5-bis(tertiary amylperoxy)-2,5-dimethylhexane (Varox);
2,5-bis(tertiary butyl peroxy)-2,5-dimethylhexyne-3(Luperco 130XL);
Tertiary butyl perbenzoate;
2,5-bis(tertiary-butylperoxy)-2,5-dimethyhexane;
1,1'-ethylenebis-[(1-tertiary-amylperoxy)-cyclohexane];
2,5-bis(tertiary-butylperoxy)-2,5-diphenyhexane;

2,5-bis(tertiary-butylperoxy)-2,5-dicyclohexylhexane;
2,5-bis(tertiary-butylperoxy)-2,5-dibenzylhexane;
2,5-bis(2,5-dimethyl-2-hexylperoxy)-2,5-dimethyhexane.

The bis-vinylidene cross-linking agent contains a divalent organic radical joining the two terminal vinylidene groups of the difunctional chain extender. This radical consists essentially of hydrocarbon carbon atoms free of carbon-to-carbon unsaturation except for aryl ring unsaturation and may have one or more oxygen atoms. Nitrogen atoms may not be present in the linearity of the divalent organic connecting radical and the acrylamides are inoperative. The oxygen atom may be an ether oxygen atom or an oxygen atom joined to a carbonyl carbon atom as in carboxylate.

Typical examples of useful difunctional cross-linking agents of the bis-vinylidene cross-linking agents include:

Ethylene diacrylate
Trimethylene diacrylate
Tetramethylene diacrylate
Pentamethylene diacrylate
Hexamethylene diacrylate
Cyclohexylidene diacrylate
Bis-acrylate of diethylene glycol
Bis-acrylate of triethylene glycol
Bis-acrylate of propylene glycol
Bis-acrylate of dipropylene glycol
1,4-butane dimethacrylate
1,3-butane dimethacrylate
1,3-propylene-2,2-dimethyl dimethacrylate
Bis-methacrylate of ethylene glycol
Bis-methacrylate of propylene glycol
Bis-methacrylate of diethylene glycol
Bis-methacrylate of triethylene glycol
Bis-methacrylate of tetra-ethylene glycol
Bis-methacrylate of polyethylene glycol
Trimethylene dimethacrylate
Pentamethylene dimethacrylate
Hexamethylene dimethacrylate
Trimethylol propane trimethacrylate
Allyl acrylate
Allyl methacrylate
Acrylic ester of allylcarbinol
Methacrylic ester of allylcarbinol An object of the invention is to provide a superior sulfur-free vulcanized terpolymer of ethylene-propylene and non-conjugated diene containing unsaturation based upon non-conjugated diene of between 0.1–1.0 mol of carbon-carbon double bond per kilogram of copolymer, preferably about 0.3 to 0.6 mol per kilogram, corresponding to an iodine number of 3 to 50, said terpolymer being reacted with a bis-vinylidene cross-linking agent at a temperature of 275–425° F. in the presence of from 2 to 10 parts of heat resistant organic peroxide, said peroxide being incorporated with the terpolymer, cross-linker and conventional filling agents in a rubber mixing mill under temperatures of about 200° F. without substantial composition prior to curing.

A further object of the invention is to provide high temperature resistant and low temperature flexible cable and wire insulation made from the vulcanized sulfur-free composition of the invention.

Another object of the invention is to provide high temperature resistant molded articles, such as rubber curing bags which are used in tire manufacture to provide air-inflated pressure on the internal wall of a tire casing which is being vulcanized, this molded bag being made from the vulcanized sulfur-free terpolymer of the present invention.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

The vulcanized sulfur-free terpolymer of the present invention includes in the preferable recipes of the following examples those conventional rubber compounding ingredients which are generally employed for the reinforcing and filling of high quality rubber for electrical insulation, e.g. rubber meeting the British Standards Specification, the U.S. Standards Specification and the Cable Makers' Association Specification as protective sheathing for electrical wire and cable. In general, the preferred recipes for wire and cable use will permit zinc oxide, china clay, French chalk and lithopone as filling and reinforcing materials, these selected on the basis of low water absorption and inertness (low reactivity). Such fillers as calcium carbonate, which is water absorptive, or water absorptive fibers such as chopped regenerated cellulose fibers or hydrated calcium sulfate cannot be used because they impair electrical properties.

Most varieties of carbon black cannot be incorporated into the mix despite the beneficial effect of carbon black for improving the tensile values and modulus of elasticity in vulcanized compositions. Only large particle size channel black known as "easy processing channel" has been found to be satisfactory; and, just as in the case of natural rubber, it is necessary that no more than 10 parts of EPC black per 100 parts of terpolymer be employed in order to achieve improved tensile strength, resistance to abrasion and resistance to tearing. The particle size of this EPC black is in the neighborhood of 30 millimicrons and the surface area is generally not more than 10.3 acres per pound. The surface area is roughly two to three times that of the semireinforcing black or of the fine thermal black. The brand names of the black which are available from commercial sources are: Spheron No. 9; Micronex W–6; Continental AA; Wyex; Kosmobile 77; Dixiedensed 77; Witco No. 12.

Carbon black filled and non-carbon pigmented formulations are now set forth.

The formulations which are summarized in Table I below were prepared in order to demonstrate typical molded compositions of the present invention especially adapted for use in shock absorbers, molded rubber articles for exposure to extremes of temperature and wire and cable insulation.

*Table I*

PREPARATION OF VULCANIZED TERPOLYMER COMPOSITIONS

| Ingredients | Parts by Weight | | |
| --- | --- | --- | --- |
| | Formulation Number | | |
| | 1 | 2 | 3 |
| Ethylene-Propylene-Hexadiene Terpolymer | 100 | 100 | 100 |
| Whitex Clay | 125 | 125 | 125 |
| EPC Black | 10 | 10 | 10 |
| Petrolatum | 5 | 5 | 5 |
| Luperco 130XL [1] | 3 | | |
| Ethylene Dimethacrylate | 10 | 2 | 5 |
| Dicup 40C [2] | | 2 | 6.25 |

| Cure Data | Cure Data and Results | | |
| --- | --- | --- | --- |
| | Formulation Number | | |
| | 1 | 2 | 3 |
| Temperature, °F | 350 | 396 | 320 |
| Time, minutes | 15 | 1 | 30 |
| Tensile, p.s.i | 1,500 | 1,600 | 1,050 |
| Elongation, percent | 200 | 400 | 400 |
| 100% Modulus, p.s.i | 1,300 | 400 | 400 |
| 200% Modulus, p.s.i | | | 800 |
| Hardness, Shore A | 65 | 60 | 65 |

[1] Luperco 130XL is 2,5-bis (tertiary butylperoxy)-2,5-dimethylhexyne-3 at 50% peroxide concentration.
[2] Dicup 40C is dicumyl peroxide.

EXAMPLE I

The polymer and filler ingredients in the above table are weighed and added to the Banbury mixer while the reactive liquid dimethacrylate coagent is separately blended with a few parts of the white or clay filler to aid in its transfer to the Banbury mixer so that none of the liquid coagent is lost on the walls of the Banbury mixer. After the first stages of coarse mixing are completed, the shearing rate in the Banbury is increased and a heat of mixing is developed which raises the temperature to about 175° F. Mixing is then held below 175° F. for 15 minutes by mixing at a shearing rate which is just sufficient to maintain, but not to exceed this temperature. The shearing rate of the Banbury is readily adjusted and the temperature attained will depend upon the particular formulation compounded.

After the Banbury mixing is completed, the composition is then placed on the usual two roll rubber mixing mill to complete the mixing. Such careful mixing may not always be needed for plant formulations but in the laboratory where quantitative differences are observed due to small variations in the percentage of ingredients, the mixing must be reproducible and uniform. There is little difference in behavior of these compositions on the laboratory mill and on the plant mill except for a tendency to jump onto the back roll which indicates that some terpolymer recipes are more "nervy" than others.

The stock is then ready for molding and vulcanizing. It is preferable not to let too much time elapse between milling and molding, although several weeks storage at 75-80° C. has proven to be satisfactory.

In the molding of samples for testing, the mold is generally lubricated with silicone lubricant. The time and temperature of vulcanizing depend upon the catalyst system but generally, a temperature of about 320° F. for 15-30 minutes is most satisfactory for producing molding schedules using Dicup or Varox catalyst. A temperature of 350° F. is desired for Luperco 130XL. Where the effectiveness of the coagents is to be evaluated rather than the whole catalyst system, a higher temperature, 350° F., for a longer time, 30 minutes, is preferable.

The following Table II using the above procedure shows the effect of type of peroxide concentration on the wire.

Table II
EFFECT OF TYPE OF PEROXIDE ON THE CURE

| Formulation Number | 3 | 4 |
|---|---|---|
| Du Pont 1070 | 100 | 100 |
| Whitex Clay | 125 | 125 |
| EPC Black | 10 | 10 |
| Petrolatum | 5 | 5 |
| Luperco 130XL [1] |  | 3 |
| Dicup 40C [2] | 6.25 |  |
| Ethylene Dimethacrylate | 5 | 5 |
| Cure Temperature, °F | 320 | 350 |
| Cure Time, Minutes | 30 | 30 |
| Tensile, p.s.i. | 1,050 | 1,375 |
| Elongation, Percent | 400 | 275 |
| 100% Modulus | 400 | 400 |
| 200% Modulus | 800 | 1,100 |
| Hardness, Shore A | 65 | 58 |

[1] Luperco 130XL is 2,5-bis (tertiary butylperoxy)-2,5-dimethyl-hexyne-3 at 50% peroxide concentration.
[2] Dicup 40C is dicumyl peroxide.

The following Table III using the above procedure shows the effect of peroxide concentration on the cure.

Table III
EFFECT OF PEROXIDE ON THE CURE

| Formulation Number | 5 | 6 | 7 | 8 | 9 | 10 | 11 | 12 |
|---|---|---|---|---|---|---|---|---|
| Du Pont Nordel 1070 | 100 | 100 | 100 | 100 | 100 | 100 | 100 | 100 |
| Whitex Clay | 125 | 125 | 125 | 125 | 125 | 125 | 125 | 125 |
| EPC Black | 10 | 10 | 10 | 10 | 10 | 10 | 10 | 10 |
| Petrolatum | 5 | 5 | 5 | 5 | 5 | 5 | 5 | 5 |
| Luperco 130XL [1] | 3 | 3 | 3 | 3 | 6 | 6 | 6 | 6 |
| Ethylene Dimethacrylate | 2 | 5 | 10 | 30 | 2 | 5 | 10 | 30 |
| Cure, 30' at 350° F.: | | | | | | | | |
| Tensile, p.s.i. | 1,200 | 1,375 | 1,500 | 1,550 | 1,100 | 1,300 | 1,400 | 1,600 |
| Elongation, percent | 300 | 275 | 200 | 300 | 300 | 175 | 200 | 150 |
| 100% Modulus | 380 | 400 | 550 | 600 | 475 | 800 | 800 | 1,200 |
| Hardness, Shore A | 58 | 58 | 65 | 67 | 67 | 67 | 67 | 72 |

[1] Lupercol 30XL is 2,5-bis (tertiary butylperoxy)-2,5-dimethylhexyne-3 at 50% per peroxide concentration.

The selection of ethylene dimethacrylate as the model (preferred) cross-linking bis-vinylidene bifunctional cross-linking agent is based upon its economy and cross-linking efficiency. Applicants have made a comparison between the cured compositions of the present invention and the cured composition ethylene-propylene copolymer rubbers in identical filler formulations, based upon Whitex clay and EPC black or both.

It has been found that the ethylene-propylene copolymer rubber cured for 15 minutes at 350° F. attains a tensile strength about one-half that of the present formulation and very excessive elongation, e.g. from about 300-900%, which result in substantially lower modulus values for the vulcanized copolymer than for the vulcanized terpolymer. The increase in hardness without the necessary increase in tensile strength and modulus values renders the copolymer of ethylene and propylene inferior for molded goods, tire stock and wire insulation to the present terpolymer vulcanizate.

It is significant that combining the peroxide and sulfur cure for the terpolymer of ethylene-propylene and non-conjugated diene (employing 1.5 parts of sulfur, 0.5 part of mercapto benzothiazole, 4-5 parts of tetramethylthiuram monosulfide, 1 part of stearic acid and 1 part of zinc oxide) leads to a sulfur-peroxide cured terpolymer which exhibits a significantly lower modulus value than the peroxide-dimethacrylate cured terpolymer, thus rendering the dual cured product generally inferior to either system of cure, e.g. sulfur or peroxide separately.

The peroxide-dimethacrylate cured terpolymer has a higher modulus, lesser elongation and tensile strength similar to the sulfur-cured terpolymer.

Table IV below shows a comparison of the different polymer curing systems. The particular filler combination selected is typical of those used in wire and cable formulations, since peroxide cures are of particular interest in this use.

*Table IV*

COMPARISON OF ETHYLENE-PROPYLENE-HEXADIENE TERPOLYMER AND ETHYLENE-PROPYLENE COPOLYMER RUBBERS

| Formulation Number | 1 | 13 | 14 | 15 |
|---|---|---|---|---|
| Ethylene-Propylene Copolymer [1] | | 100 | 100 | |
| Ethylene-Propylene-Hexadiene Terpolymer [2] | 100 | | | 100 |
| Whitex Clay | 125 | 125 | 125 | 125 |
| EPC Black | 10 | 10 | 10 | 10 |
| Petrolatum | 5 | 5 | 5 | 5 |
| Luperco 130XL [3] | 3 | 3 | 3 | |
| Ethylene Dimethacrylate | 10 | 10 | | |
| Sulfur | | | 0.35 | 1.5 |
| Mercaptobenzothiazole | | | | 0.5 |
| Tetramethylthiuram Monosulfide | | | | 1.5 |
| Stearic Acid | | | | 1 |
| Zinc Oxide | | | | 5 |
| Cure, 15 minutes at 350° F.: | | | | |
| Tensile, p.s.i. | 1,500 | 800 | 630 | 1,600 |
| Elongation, percent | 200 | 300 | 900 | 700 |
| 100% Modulus, p.s.i. | 1,300 | 325 | <50 | 287 |
| Hardness, Shore A | 65 | 61 | 53 | 62 |

[1] Enjay EPR-404.
[2] Du Pont Nordel 1070.
[3] 2,5-bis(tertiary butylperoxy)-2,5-dimethylhexyne-3 at 50% peroxide concentration.

Having thus disclosed the invention, we claim:

1. A vulcanized composition of matter consisting essentially of a terpolymer of 33–80 mol percent of ethylene, 1–15 mol percent of non-conjugated diene having at least 6 carbon atoms and the remainder propylene, said terpolymer formed by ionic polymerization of the monomers in an inert solvent selected from the class consisting of hydrocarbon solvents and chlorinated hydrocarbon solvents, said terpolymer being reacted with a heat-resistant organic peroxide in an amount of from 2 to 10 parts peroxide per 100 parts of terpolymer, said organic peroxide being capable of being heated to a temperature of at least 250° F. without substantial decomposition but decomposing rapidly at temperatures of 275–425° F. to react with a cross-linking agent, and a bifunctional cross-linking agent selected from the group consisting of acrylate diesters, methacrylate diesters, vinyl esters of acrylic acid, vinyl esters of methacrylic acid, allyl esters of acrylic acid, allyl esters of methacrylic acid, vinyl esters of aromatic polycarboxylic acids and vinyl esters of aliphatic polycarboxylic acids, said cross-linking agent being present in an amount of from 2 to 30 parts per 100 parts of said terpolymer.

2. A composition as claimed in claim 1 wherein said cross-linking agent is bis-methacrylate of ethylene glycol.

3. A composition as claimed in claim 1 wherein said cross-linking agent is 1,3-butane dimethacrylate.

4. A composition as claimed in claim 1 wherein said cross-linking agent is allyl methacrylate.

5. A composition as claimed in claim 1 wherein said cross-linking agent is trimethylol propane trimethacrylate.

6. A composition as claimed in claim 1 wherein said cross-linking agent is diethylene glycol diacrylate.

7. A composition used as wire insulation as claimed in claim 1 wherein said organic peroxide is dicumyl peroxide.

8. A composition used as wire insulation as claimed in claim 1 wherein said organic peroxide is 2,5-dimethyl-2,5-tertiary butyl peroxy hexyne-3.

9. A composition used as wire insulation as claimed in claim 1 wherein said organic peroxide is 2,5-dimethyl-2,5-tertiary butyl peroxy hexane.

10. A composition used as wire insulation as claimed in claim 1 wherein said organic peroxide is tertiary butyl perbenzoate.

11. A method of cross-linking a terpolymer consisting of 33–80 mol percent of ethylene, 1–15 mol percent of non-conjugated dien having at least 6 carbon atoms and the remainder propylene comprising reacting said terpolymer with a bifunctional cross-linking agent and a heat-resistant organic peroxide in an amount of from 2 to 10 parts peroxide per 100 parts of terpolymer, said bifunctional cross-linking agent being selected from the class consisting of acrylate diesters, methacrylate diesters, vinyl esters of acrylic acid, vinyl esters of methacrylic acid, allyl esters of acrylic acid, allyl esters of methacrylic acid, vinyl esters of aromatic polycarboxylic acids and vinyl esters of aliphatic polycarboxylic acids, said cross-linking agent being present in an amount of from 2 to 30 parts per 100 parts of said terpolymer, heating at a temperature of from 275–425° F. for a period of from 10 minutes to 1 hour.

12. A method of cross-linking a terpolymer as claimed in claim 11 wherein said heat-resistant organic peroxide is dicumyl peroxide.

13. A method of cross-linking a terpolymer as claimed in claim 11 wherein said heat-resistant organic peroxide is 2,5-dimethyl-2,5-tertiary butyl peroxy hexyne-3.

14. A method of cross-linking a terpolymer as claimed in claim 11 wherein said heat-resistant organic peroxide is 2,5-dimethyl-2,5-tertiary butyl peroxy hexane.

15. A method of cross-linking a terpolymer as claimed in claim 11 wherein said heat-resistant organic peroxide is tertiary butyl perbenzoate.

References Cited by the Examiner

UNITED STATES PATENTS 2,933,480  4/1960  Gresham et al. _____ 260—80.5
3,125,546  3/1964  Piner et al. _____ 260—877

MURRAY TILLMAN, *Primary Examiner.*

SAMUEL H. BLECH, *Examiner.*

D. J. BREZNER, *Assistant Examiner.*